United States Patent [19]
Su et al.

[11] Patent Number: 5,632,936
[45] Date of Patent: May 27, 1997

[54] METHOD AND APPARATUS FOR MOLDING OPHTHALMIC LENSES USING VACUUM INJECTION

[75] Inventors: Kai C. Su; Jack C. White, both of Alpharetta, Ga.; Hans U. Schlapfer, Seattle, Wash.

[73] Assignee: Ciba-Geigy AG, Basel, Switzerland

[21] Appl. No.: 237,875

[22] Filed: May 4, 1994

[51] Int. Cl.⁶ .................................................. B29D 11/00
[52] U.S. Cl. .................... 264/2.5; 264/1.38; 264/571; 264/DIG. 78; 264/335; 425/174.4; 425/176; 425/405.1; 425/437; 425/808; 425/DIG. 60
[58] Field of Search ............................ 264/1.1, 2.5, 1.38, 264/101, 102, 571, DIG. 78, 335; 425/808, DIG. 60, 174.4, 176, 437, 405.1

[56] References Cited

U.S. PATENT DOCUMENTS

| | | | |
|---|---|---|---|
| 2,913,036 | 11/1959 | Smith | 264/DIG. 78 |
| 2,985,928 | 5/1961 | Heskett | 264/DIG. 78 |
| 3,829,263 | 8/1974 | Yao et al. | 425/DIG. 60 |
| 3,970,732 | 7/1976 | Slaats et al. | |
| 4,170,616 | 10/1979 | Jebens | 264/102 |
| 5,052,916 | 10/1991 | Dullings et al. | 425/808 |
| 5,059,112 | 10/1991 | Wieser | 264/571 |
| 5,256,366 | 10/1993 | Wejrock | 264/571 |
| 5,281,372 | 1/1994 | Hayashi et al. | 264/DIG. 78 |
| 5,435,943 | 7/1995 | Adams et al. | 425/808 |

FOREIGN PATENT DOCUMENTS 0561480  9/1993  European Pat. Off.

OTHER PUBLICATIONS

Patent Abstracts of Japan, vol. 13, No. 6 (M–781) (3354) 9 Jan. 1989.
Patent Abstracts of Japan, vol. 13, No. 299 (M–847 (3647) 11 Jul. 1989.
Patent Abstracts of Japan, vol. 12, No. 437 (M–765) (3284) 17 Nov. 1988.

*Primary Examiner*—Mathieu D. Vargot
*Attorney, Agent, or Firm*—Wenderoth, Lind & Ponack

[57] ABSTRACT

A lens mold cavity is formed and then evacuated via a vacuum channel contained within a mold member. A fluid valve is opened to expose the lens mold cavity to liquid lens material, whereby a vacuum of the lens mold cavity draws the liquid lens material to fill the lens mold cavity. The fluid valve is then closed and the liquid lens material within the lens mold cavity is cured to obtain an opthalmic lens such as a contact lens.

22 Claims, 5 Drawing Sheets

METHOD AND APPARATUS FOR MOLDING OPHTHALMIC LENSES USING VACUUM INJECTION

BACKGROUND OF THE INVENTION

1. Field of the Invention

The present invention generally relates to a method and apparatus for making ophthalmic lenses, and more particularly, to a method and apparatus for making opthalmic lenses, particularly contact lenses, using a vacuum injection process.

2. Description of the Related Art

Conventionally, a contact lens is molded using a two-sided mold in which one side of the mold includes a convex surface and the other side of the mold includes an opposing concave surface, and in which a cavity for forming the lens is defined by the opposing convex and concave surfaces. A lens is formed by placing a lens material on one of the convex and concave surfaces, bringing the two sides of the mold together to form the lens cavity and separating the two sides of the mold to expose the molded lens after polymerization of the lens material.

This conventional technique, however, suffers various drawbacks.

For example, in manufacturing the contact lens, lens material of a sufficient quantity to exceed the volume of the lens cavity is placed on one of the mold surfaces, and then the two sides of the mold are brought together to form the lens cavity. The quantity of excess lens material is collected along the outer periphery of the mold external the lens cavity to form a ring of excess polymerized lens material. This excess lens material is then uneconomically discarded as waste.

Further, since the excess lens material is forced from the lens cavity as the two sides of the mold are brought together, and since as a result the annular rims of the two sides of the mold are brought together with lens material interposed therebetween, occasionally lens material will be trapped between the annular rims of the two sides of the mold to disadvantageously cause flash along the outer edge of the molded lens.

Also, when the lens material is placed on one of the convex and concave surfaces, on occasion an air bubble will form between the lens material and the convex or concave surface. Such an air bubble can remain trapped in the mold cavity as the two sides of the mold are brought together, thus causing a defect in the molded lens after polymerization.

SUMMARY OF THE INVENTION

It is an object of the present invention to provide a method and apparatus for manufacturing an ophthalmic lens, particularly a contact lens, which overcome the drawbacks of the conventional technique described above.

That is, it is an object of the present invention to provide a method and apparatus for manufacturing an ophthalmic lens, particularly a contact lens, in which it is not necessary to waste lens material, in which flash is not formed along the outer edge of the molded lens, and in which air bubbles are not trapped in the mold cavity during polymerization of the lens material.

In order to achieve the above and other objects, a method of making a molded opthalmic lens, particularly a contact lens, according to the present invention includes forming a lens mold cavity having a configuration conforming to the opthalmic lens to be molded, evacuating the lens mold cavity to create a vacuum within the lens mold cavity, introducing a liquid lens material into the evacuated lens mold cavity, wherein the vacuum within the lens cavity draws the liquid lens material into the lens cavity to fill the lens cavity, and curing the lens material within the lens mold cavity to obtain the molded opthalmic lens.

Further, an apparatus for making a molded opthalmic lens, particularly a contact lens, according to the present invention includes a first mold member having one of an optically finished convex or concave surface and configured to receive a second mold member having one of an optically finished convex or concave surface so as to define a lens cavity therebetween having a configuration conforming to the opthalmic lens to be molded, a vacuum channel communicating with an area between the first mold member and the second mold member received by the first mold member, the vacuum channel connectable to a vacuum pump for evacuating the area between the first mold member and the second mold member received by the first mold member, a fluid channel in fluid communication with the lens cavity for containing a liquid lens material, and a fluid valve operatively interposed in the fluid channel to control the flow of liquid lens material into the lens cavity defined between the first mold member and the second mold member received by the first mold member.

DESCRIPTION OF THE DRAWINGS

The above and other objects and features of the present invention will become readily apparent from the description which follows with reference to the accompanying drawings in which like parts are designated by like reference numerals, and in which.

DETAILED DESCRIPTION OF THE PREFERRED EMBODIMENT

The present invention will now be described in detail with reference to the accompanying drawings.

Figure 1:
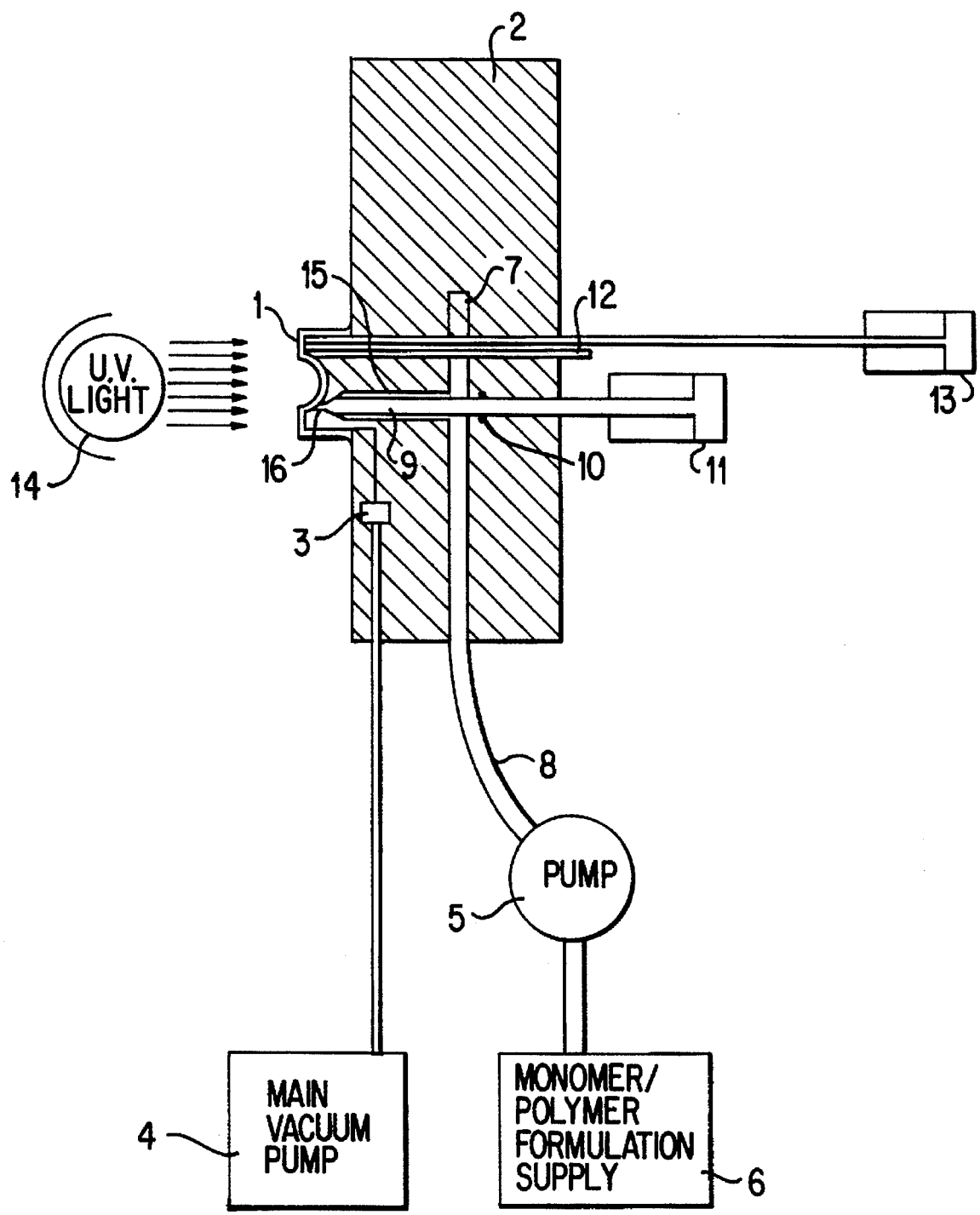
FIG. 1 is an overall system diagram of the apparatus for molding contact lenses according to the present invention.

Reference is first made to FIG. 1 which generally shows the apparatus for manufacturing an ophthalmic lens according to the present invention.

A tool 2 includes a projecting member 16 containing an optically finished concave surface. A mold member 1 having an optically finished convex surface is fitted around the projecting member 16 of the tool 2 to form a vacant area therebetween, the vacant area including a lens cavity between the opposing concave and convex surfaces. A vacuum channel 3 communicates with the vacant area between the mold member 1 and projecting member 16 of the tool 2 and is coupled to a vacuum pump 4.

The tool 2 includes a fluid channel 15 extending between the lens cavity and a runner 7. The runner 7 may extend to additional fluid channels associated with other respective projecting members to realize simultaneous production of plural lenses. A monomer/polymer lens material is conveyed through the runner 7 from a supply 6 via a pump 5 and check valve or feed valve 8. A movable gate pin 9 extends within the fluid channel 15 and is coupled to a drive cylinder 11. The drive cylinder 11 controls the gate pin 9 to open and seal a passage between the lens cavity and the fluid channel 15. The drive cylinder 11 is sealed from the runner 7 and fluid channel 15 by a gate pin seal 10 such as an O-ring or the like.

At least one ejector pin assembly 13 may provided to urge the mold member 1 away from the projecting member 16 to thereby disengage the mold member 1. Further, an air blow off passage 12 may be provided in the event that it is necessary to break the vacuum between the mold member 1 and the projection member 16 in order to disengage the mold member 1 from the projection member 16. The air blow off passage 12 may be provided with an air valve mechanism at the lens cavity. Alternately, a mechanical ejector assembly may be used to break the vacuum seal.

Finally, an ultraviolet (U.V.) light source 14 is provided to cure the lens material contained in the lens cavity.

The process of the present invention for forming an ophthalmic lens using the apparatus of FIG. 1 will now be described with reference to FIGS. 2(a) through 2(d).

Figure 2A:
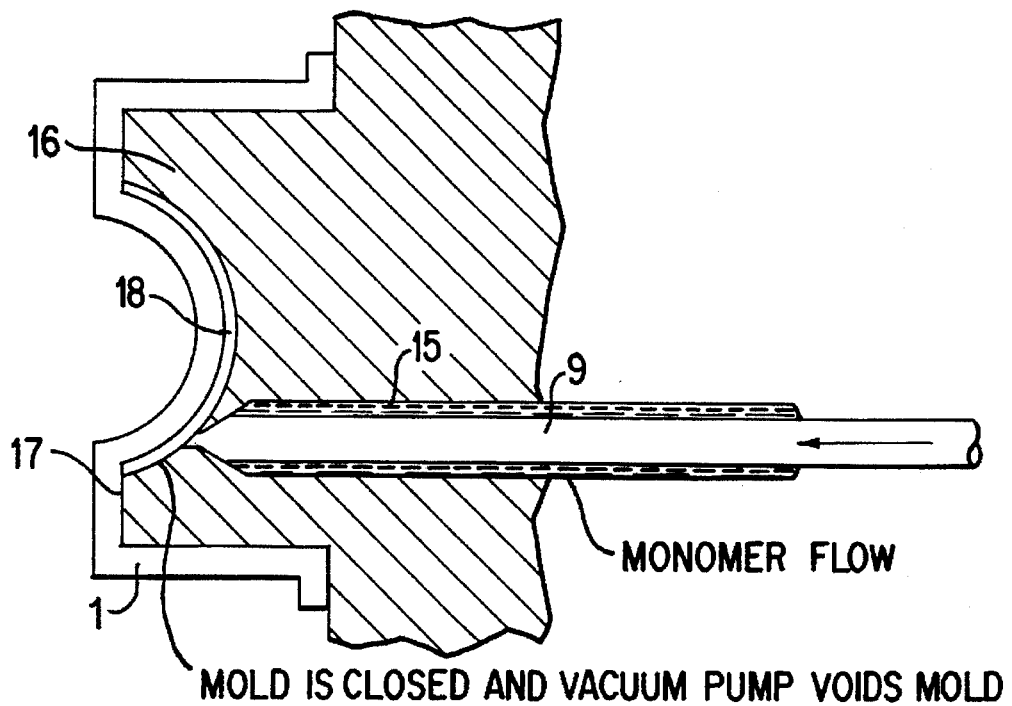
FIGS. 2(a)–2(d) are cross-sectional diagrams for explaining the method for molding contact lenses according to the present invention.

First, as shown in FIG. 2(a), the mold member 1 is fitted over the projection member 16 of the tool 2 to form a vacant area 17, including a lens cavity 18, between the mold member 1 and the projection member 16. The vacant area 17 is open to a vacuum channel (not shown), but is otherwise air tight. As also shown in FIG. 2(a), the gate pin 9 is initially in a closed state to prevent the liquid lens material from flowing into the lens cavity 18 via the fluid channel 15.

Next, still referring to FIG. 2(a), the vacant area 17 is evacuated to force the mold member 1 closely against the projecting member 16 and to remove air contained in the lens cavity 18. That is, in this state, a vacuum exist in the lens cavity 18. The evacuation is carried out using the vacuum pump 4 and vacuum channel 3 shown in FIG. 1. The evacuation of the vacant area 17 assists in forcing the annular wall surrounding the convex surface of the projection member 16 to tightly contact the annular wall surrounding the concave surface of the mold member 1 so as to prevent the passage therebetween of lens material at the periphery of the lens cavity 18. Mechanical clamping may also be used to insure adequate seal.

Figure 2B:
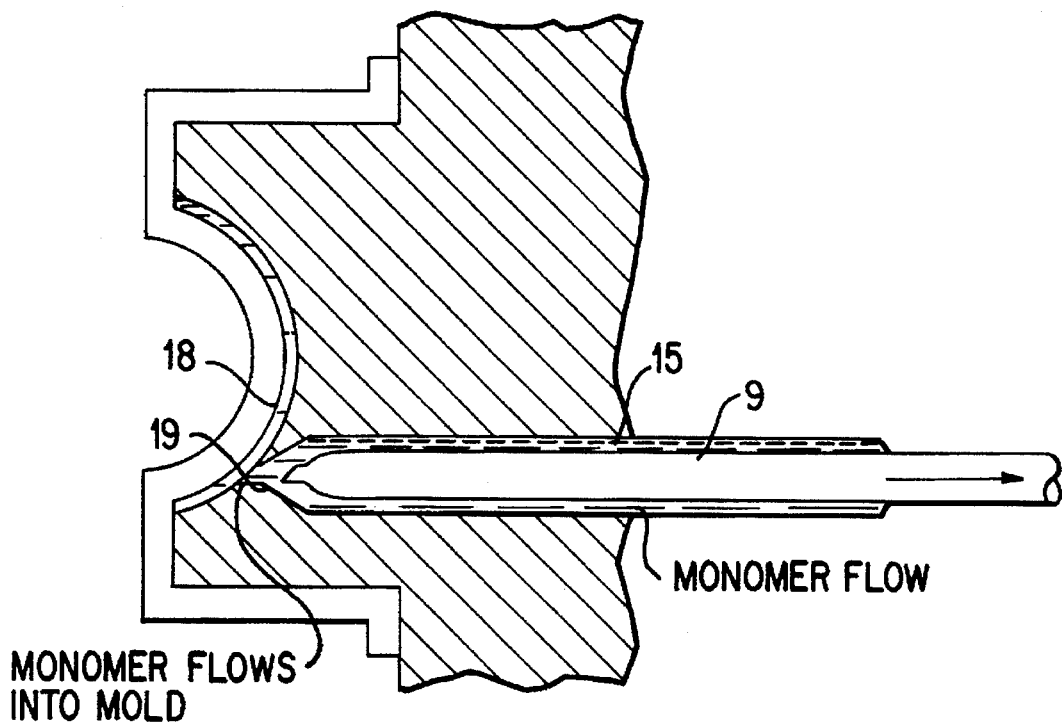

Referring now to FIG. 2(b), the movable gate pin 9 is extracted from the valve seat 19 of the fluid channel 15, thus exposing the fluid channel 15 to the evacuated lens cavity 18. Vacuum pressure within the lens cavity 18 draws the liquid lens material to fill the lens cavity 18. Liquid pressure of the pump 5 and runner 7 assembly shown in FIG. 1 can also contribute to the forcing of the liquid lens material into the lens cavity 18.

Figure 2C:
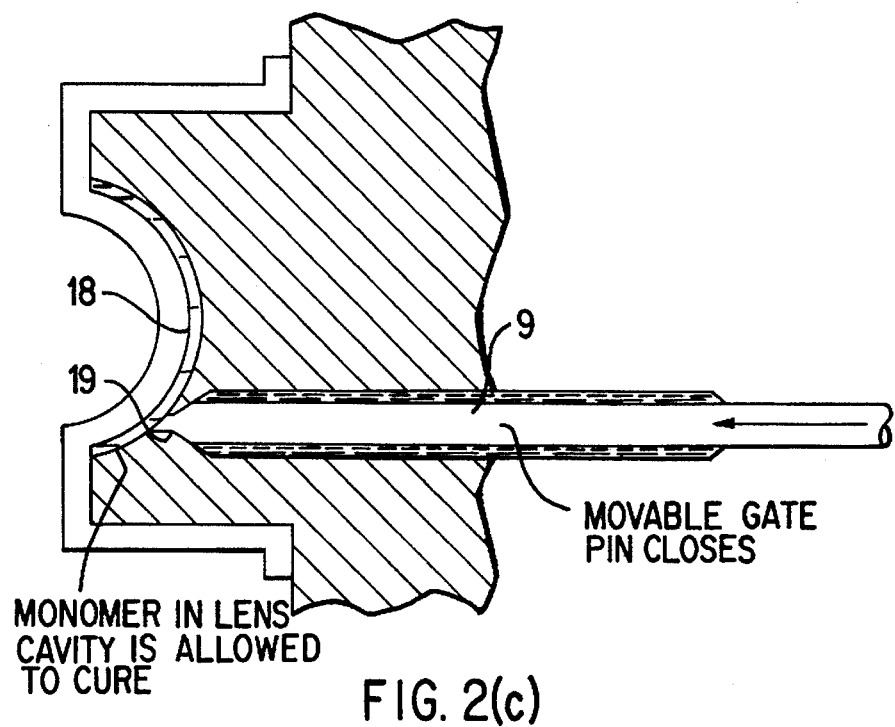

As shown in FIG. 2(c), once the lens cavity 18 is filled with liquid lens material, the movable gate pin 9 is placed back into the valve seat 19 to seal the lens cavity 18. The lens material within the lens cavity 18 is then allowed to cure using the U.V. light source 14 shown in FIG. 1.

Figure 2D:
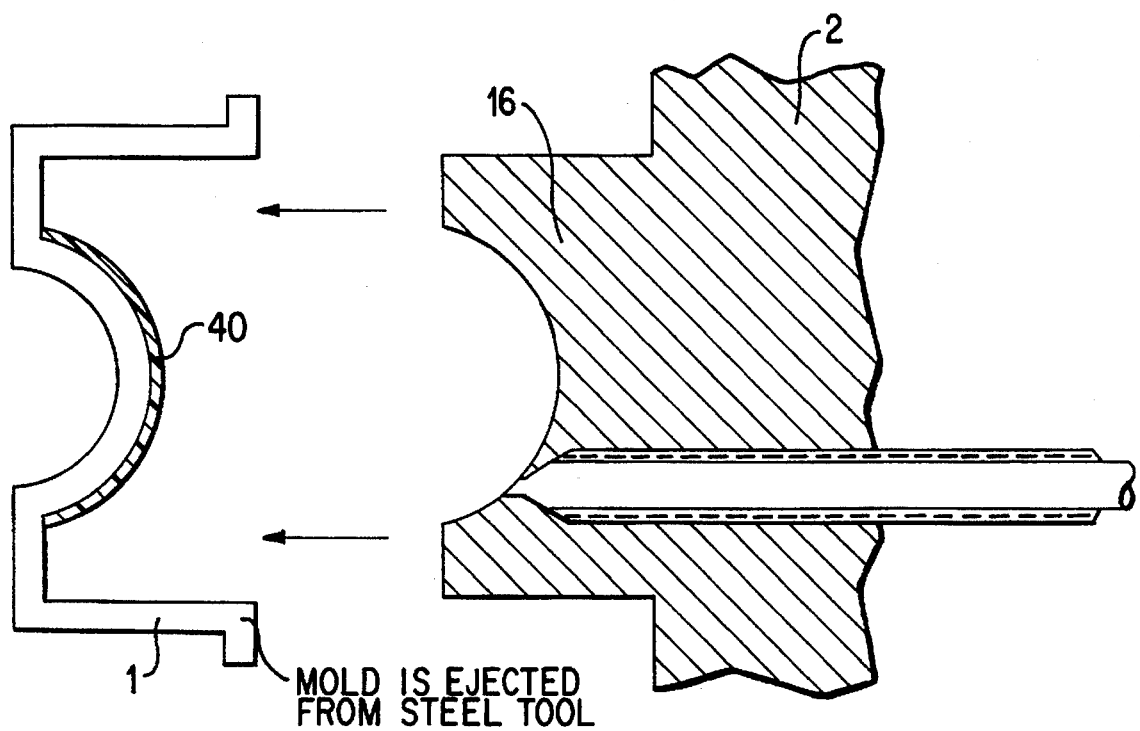

Finally, as shown in FIG. 2(d), the mold member 1 containing the cured lens 40 is detached from the projection member 16 of the tool 2. The detachment of the mold member 1 may be carried out, for example, using the ejector pin assembly 13 shown in FIG. 1.

The above-described process is advantageous in several respects. First, since the annular walls of the mold member 1 and the projection member 16 are brought together in the absence of a lens material therebetween, the likelihood of the development of flash between the annular walls is substantially reduced. Further, only a quantity of lens material which is necessary to fill the lens cavity 18 is used to mold the lens, and accordingly there is no excess lens material which is wasted. Still further, since the lens cavity 18 is evacuated prior to being filled with lens material, air bubbles are not trapped within the lens material contained in the lens cavity 18, thereby reducing the change for molding defects caused by the presence of air.

The present invention will now be described in greater detail with reference to FIGS. 3 and 4.

Figure 3:
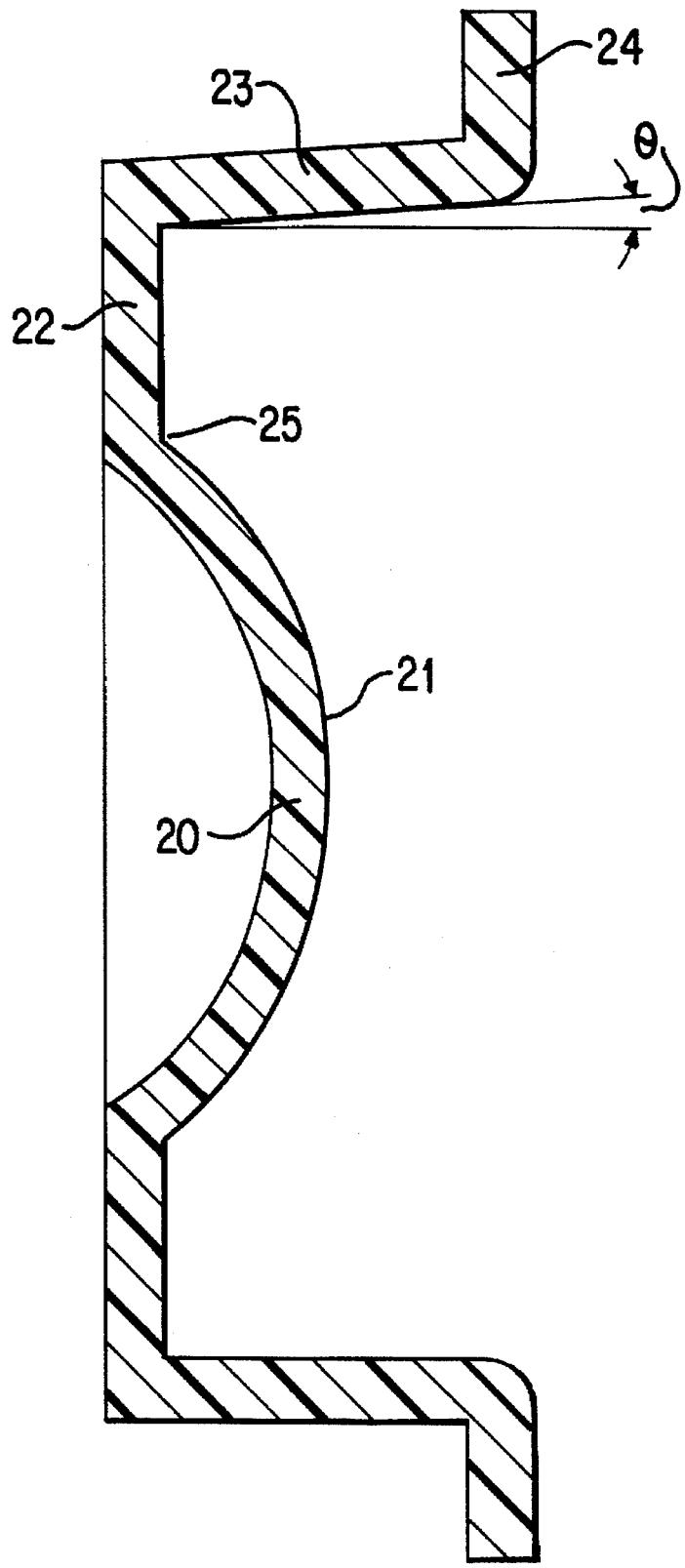
FIG. 3 is a detailed cross-sectional diagram of a mold member used in the present invention.

FIG. 3 is a detailed cross-sectional view of the lens mold member 1 which may be used in the present invention. The lens mold member 1 is formed of a plastic material having sufficient rigidity to withstand the evacuation of the lens cavity as described above. The mold member 1 includes a central portion 20 having an optically finished convex surface 21, an annular wall 22 surrounding the central portion 20, a generally cylindrical wall 23 having one end joining an outer periphery of the annular wall 22, and an annular flange 24 joining the other end of the generally cylindrical wall 23.

As also shown in FIG. 3, a annular recess 25 may be provided where the convex surface 21 and the annular wall 22 come together to define an outer edge of the molded lens. Further, the generally cylindrical wall 23 can be made to extend slightly outwardly by an angle $\theta$ in a frustoconical manner to facilitate placement of the mold member 1 on to the projection member 16 of the tool 2.

Figure 4:
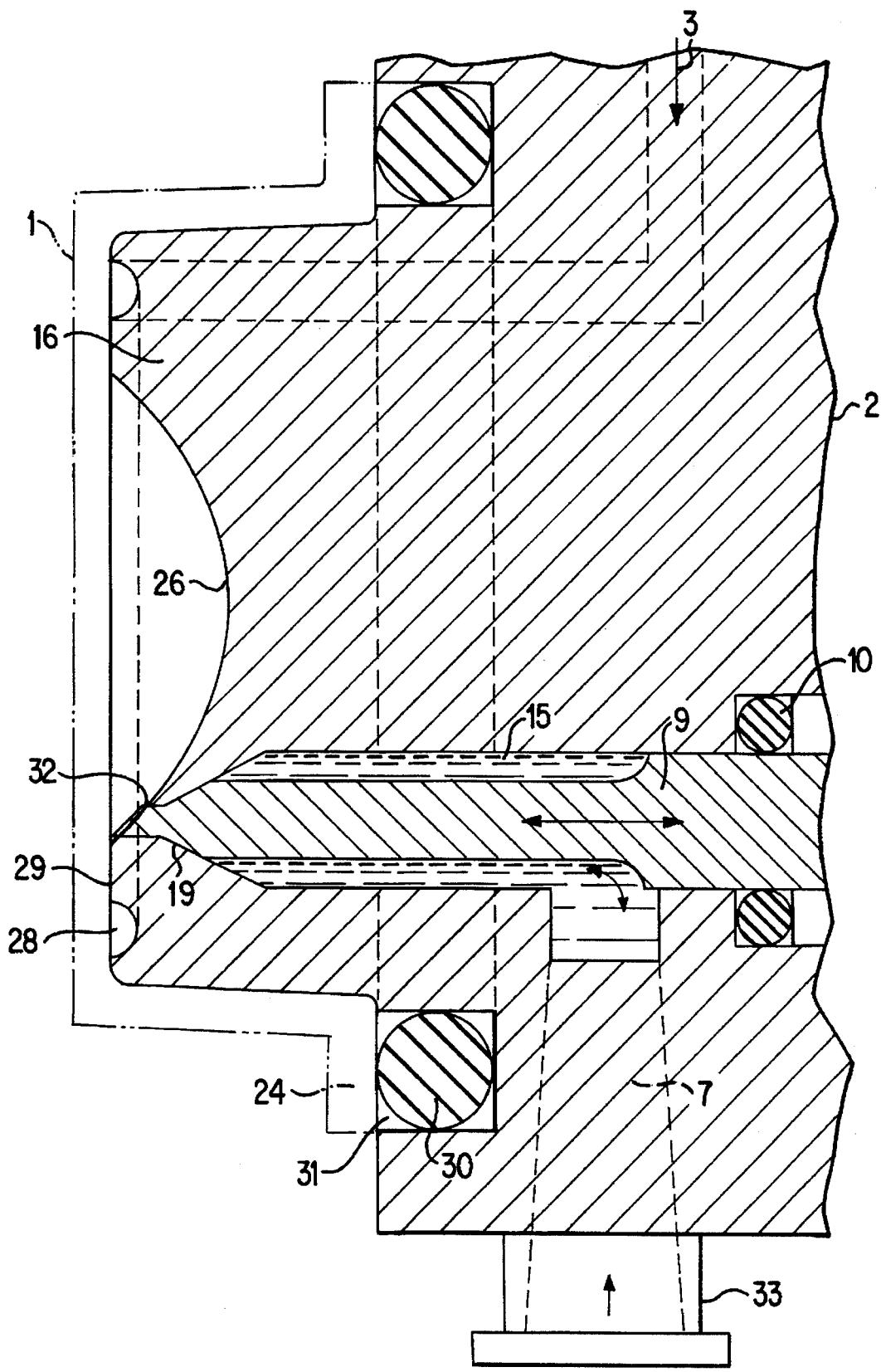
FIG. 4 is a detailed cross-sectional diagram of a tool assembly of the apparatus for molding contact lenses according to the present invention.

Turning to FIG. 4, an embodiment of the tool 2 assembly according to the present invention will now be described.

The projection member 16 of the tool 2 is configured to conform to the shape of the mold member 1. The dashed line appearing in FIG. 4 denotes an outer edge of the mold member 1 fitted over the projecting member 16. The tool 2 may be made of metal such as steel or brass, for example, or made of plastic or glass and includes an optically finished concave surface 26. Also, the surface 26 may be coated to reduce adhesion. When the mold member 1 is fitted over the projecting member 16 of the tool 2, the optically finished convex surface 21 of the mold member 1 (shown in FIG. 3) confronts the optically finished concave surface 26 of the tool 2 to define a lens cavity therebetween.

The projecting member 16 includes an annular surface 29 surrounding the concave surface 26. A circular recess 28 is provided in the annular surface 29 and communicates with a vacuum channel 3.

The flange 24 of the mold member 1 contacts an O-ring 30 contained in an annular seat 31 of the tool 2. The O-ring 30 provides an airtight seal between the mold member 1 and the projecting member 16 of the tool 2 to permit evacuation via the vacuum channel 3.

The gate pin 9 extends through the fluid channel 15 to the valve seat 19. An end of the gate pin 9 is optically finished and extends through an opening 32 in the concave surface 26 of the tool 2.

The gate pin 9 is coupled to a drive cylinder (not shown) which is capable of moving the gate pin 9 in the directions of the depicted arrow into and out of the valve seat 19. An O-ring is provided for the gate pin seal 10 to seal the fluid chamber 15 from the drive cylinder mechanism.

The fluid runner 7 communicates with an inlet 33 which receives liquid lens material via a monomer/polymer supply and pump (e.g. as shown in FIG. 1). Alternately, a syringe may be coupled to the inlet 33 to supply the liquid lens material.

The process of molding a contact lens according to the present invention will now again be described with reference to FIGS. 3 and 4.

The mold member 1 is placed over the projecting member 16 of the tool 2. The vacant area between the mold member 1 and the projecting member 16 is evacuated via the recess 28 and vacuum channel 3, whereby the flange 24 and O-ring 30 provide an airtight seal. In this state, the annular wall 22 of the mold member 1 tightly contacts the annular surface 29 of the projection member 16 of the tool 2.

When evacuation is complete, the drive cylinder extracts the gate pin from the valve seat 19 to thereby expose the opening 32 to the fluid channel 15. Vacuum pressure within the lens cavity draws the liquid lens material contained in the fluid channel 15 via the opening 32 to thereby fill the lens cavity. Once the lens cavity is filled, the drive cylinder moves the gate pin 9 back into the valve seat 19 to close the opening 32.

It is noted that the location of the opening 32 should be placed outside of an optical area of the molded lens, since the opening 32 and end of the gate pin 9 can leave an impression in the surface of the molded lens.

After the lens is cured using a U.V. light source, the mold member 1 is detached from the projection member 16 of the tool 2. Although not shown in FIG. 4, detachment of the mold member 1 may be carried out using at least one ejector pin assembly 13 shown in FIG. 1. Also, although not shown in FIG. 4, it may be necessary to provide an air blow off passage 12 shown in FIG. 1 to break the vacuum between the mold member 1 and the projection member 16 prior to disengagement of the mold member 1 from the projection member 16. It is noted that an air valve of the air blow off passage 12, which communicates with the lens cavity, should be placed outside the optical area of the molded lens.

Although a preferred embodiment of the present invention has been described in detail, it is noted that various modifications will be readily apparent to those skilled in the art, and that such modifications are intended to be encompassed by the present invention as defined in the claims which follow. As one example only, the mold member 1 may form a concave surface and the tool 2 a convex surface, rather that vice versa as described above. Alternately, as another example, both surfaces may be formed by mold members which are fit into the vacuum apparatus. Additionally, it is contemplated that the invention can be applied to the formation of interocular lenses as well as contact lenses.

What is claimed is:

1. A method of making a molded ophthalmic lens comprising:

forming a lens mold cavity having a configuration conforming to the opthalmic lens to be molded;

evacuating the lens mold cavity to create a vacuum within the lens mold cavity;

introducing a liquid lens material into the evacuated lens mold cavity by opening a valve having a valve opening at the lens mold cavity, wherein the vacuum within the lens cavity draws the liquid lens material into the lens mold cavity through the valve opening to fill the lens cavity; and, curing the lens material within the lens mold cavity to obtain the molded opthalmic lens.

2. A method as claimed in claim 1, wherein the opthalmic lens to be molded is a contact lens.

3. A method of making a molded ophthalmic lens comprising:

placing a first mold member having one of an optically finished convex or concave surface in contact with a second mold member having one of an optically finished convex or concave surface to form a lens mold cavity having a configuration conforming to the opthalmic lens to be molded;

evacuating the lens mold cavity to create a vacuum within the lens mold cavity;

opening a valve having a valve opening at the lens mold cavity to introduce liquid lens material into the evacuated lens mold cavity, wherein the vacuum within the lens cavity draws the liquid lens material into the lens mold cavity via the valve opening to fill the lens cavity;

closing the valve after the lens mold cavity is filled with liquid lens material;

curing the lens material within the lens mold cavity to obtain the molded opthalmic lens.

4. A method as claimed in claim 3, wherein the opthalmic lens to be molded is a contact lens.

5. A method as claimed in claim 3, further comprising introducing the liquid lens material into a fluid channel which communicates with the valve and which is contained in the second mold member.

6. A method as claimed in claim 5, wherein the opthalmic lens to be molded is a contact lens.

7. A method as claimed in claim 5, further comprising, after curing the lens material, opening an air valve having a valve opening at the lens mold cavity so as to remove a vacuum present between the molded ophthalmic lens and the second mold member, and then detaching the first mold member containing the molded ophthalmic lens from the second mold member.

8. A method as claimed in claim 7, wherein the opthalmic lens to be molded is a contact lens.

9. An apparatus for making a molded ophthalmic lens comprising:

a first mold member having one of an optically finished convex or concave surface and configured to receive a second mold member having one of an optically finished convex or concave surface so as to define a lens cavity therebetween having a configuration conforming to the ophthalmic lens to be molded;

a vacuum channel communicating with an area between said first mold member and the second mold member received by said first mold member, said vacuum channel connectable to a vacuum pump for evacuating the area between said first mold member and the second mold member received by said first mold member;

a fluid channel, in fluid communication with the lens cavity defined between said first mold member and the second mold member received by said first mold member, for containing a liquid lens material; and, a fluid valve, having a valve opening at said lens cavity, operatively interposed in said fluid channel to control a flow of the liquid lens material drawn by a vacuum into the lens cavity defined between said first mold member and the second mold member received by said first mold member.

10. An apparatus as claimed in claim 9, wherein the configuration of said lens cavity conforms to a contact lens.

11. An apparatus as claimed in claim 9, wherein said valve opening is along said optically finished convex or concave surface of said first mold member.

12. An apparatus as claimed in claim 11, wherein said valve opening is located outside an optical region of the opthalmic lens to be molded along said optically finished convex or concave surface of said first mold member.

13. An apparatus as claimed in claim 12, wherein the configuration of said lens cavity conforms to a contact lens.

14. An apparatus as claimed in claim 12, wherein said fluid valve further includes a movable gate pin contained within said fluid channel which is movable into and out of said valve opening to selectively seal and open said valve opening.

15. An apparatus as claimed in claim 14, wherein the configuration of said lens cavity conforms to a contact lens.

16. An apparatus as claimed in claim 14, wherein said vacuum channel and said fluid channel and said fluid valve are contained in said first mold member.

17. An apparatus as claimed in claim 16, wherein said first mold member is made of steel.

18. An apparatus as claimed in claim 17, wherein the configuration of said lens cavity conforms to a contact lens.

19. An apparatus as claimed in claim 17, further comprising an ejector pin assembly for ejecting the second mold member from said first mold member.

20. An apparatus as claimed in claim 19, further comprising an air blow off passage having a closable opening along said optically finished convex or concave surface of said first mold member.

21. An apparatus as claimed in claim 20, wherein the configuration of said lens cavity conforms to a contact lens.

22. An apparatus as claimed in any one of claims 9 through 21, further comprising an ultraviolet light source for curing the liquid lens material introduced into the lens cavity by said fluid valve.

* * * * *